United States Patent
Voth et al.

(10) Patent No.: US 6,905,326 B2
(45) Date of Patent: Jun. 14, 2005

(54) BLOW MOLDING MACHINE COMPRISING CONTROL VALVES, WHICH ARE MOUNTED ON THE BLOWING DEVICE AND WHICH CONTROL THE BLOWING AIR

(75) Inventors: Klaus Voth, Obertraubling-Piesenkofen (DE); Christian Stoiber, Michelsneukirchen (DE)

(73) Assignee: Krones AG, Neutraubling ( * ) Notice: Subject to any disclaimer, the term of this patent is extended or adjusted under 35 U.S.C. 154(b) by 54 days.

(21) Appl. No.: 10/168,279
(22) PCT Filed: Oct. 17, 2001
(86) PCT No.: PCT/EP01/12011
  § 371 (c)(1),
  (2), (4) Date: Sep. 30, 2002
(87) PCT Pub. No.: WO02/34500
  PCT Pub. Date: May 2, 2002

(65) Prior Publication Data
US 2003/0118686 A1 Jun. 26, 2003

(30) Foreign Application Priority Data
Oct. 28, 2000 (DE) .................................. 200 18 500 U

(51) Int. Cl.[7] .............................................. B29C 49/58
(52) U.S. Cl. ...................................... 425/529; 425/535
(58) Field of Search .............................. 425/535, 529; 65/261, 262, 263; B29C 49/58

(56) References Cited

U.S. PATENT DOCUMENTS

| | | | |
|---|---|---|---|
| 3,640,671 A | | 2/1972 | Reilly |
| 3,747,625 A | | 7/1973 | Reilly |
| 3,819,317 A | * | 6/1974 | Higginbotham ............ 425/535 |
| 3,993,427 A | * | 11/1976 | Kauffman et al. .......... 425/529 |
| 4,009,980 A | * | 3/1977 | Armour et al. ............ 425/529 |
| 4,052,187 A | * | 10/1977 | Spaeth et al. ................. 65/261 |
| 4,131,665 A | * | 12/1978 | Bodson et al. ............. 264/572 |
| 4,173,447 A | * | 11/1979 | Bradbury ................... 425/535 |
| 4,214,860 A | | 7/1980 | Kleimenhagen et al. |
| 5,182,122 A | * | 1/1993 | Uehara et al. ............. 425/535 |
| 5,328,351 A | * | 7/1994 | Schonebeck ............... 425/535 |
| 5,501,253 A | | 3/1996 | Weiss |

FOREIGN PATENT DOCUMENTS

| | | |
|---|---|---|
| DE | 2 008 832 | 9/1970 |
| DE | 26 57 670 | 6/1977 |
| DE | 27 42 693 C2 | 8/1983 |
| DE | 93 11 427.3 U1 | 9/1994 |

* cited by examiner

*Primary Examiner*—Robert B. Davis
(74) *Attorney, Agent, or Firm*—Marshall, Gerstein & Borun LLP

(57) ABSTRACT

A blow molding machine with at least one blow mold for producing hollow bodies from heated performs, at least one blow nozzle for leading the blow air into the performs and a plurality of valves for controlling the feeding and the removal of the blow air to and from the blow nozzle, whereby the valves are arranged on an annular valve carrier surrounding the blow nozzle, resulting in a compact design with short cycle times.

8 Claims, 3 Drawing Sheets

Figure 1:
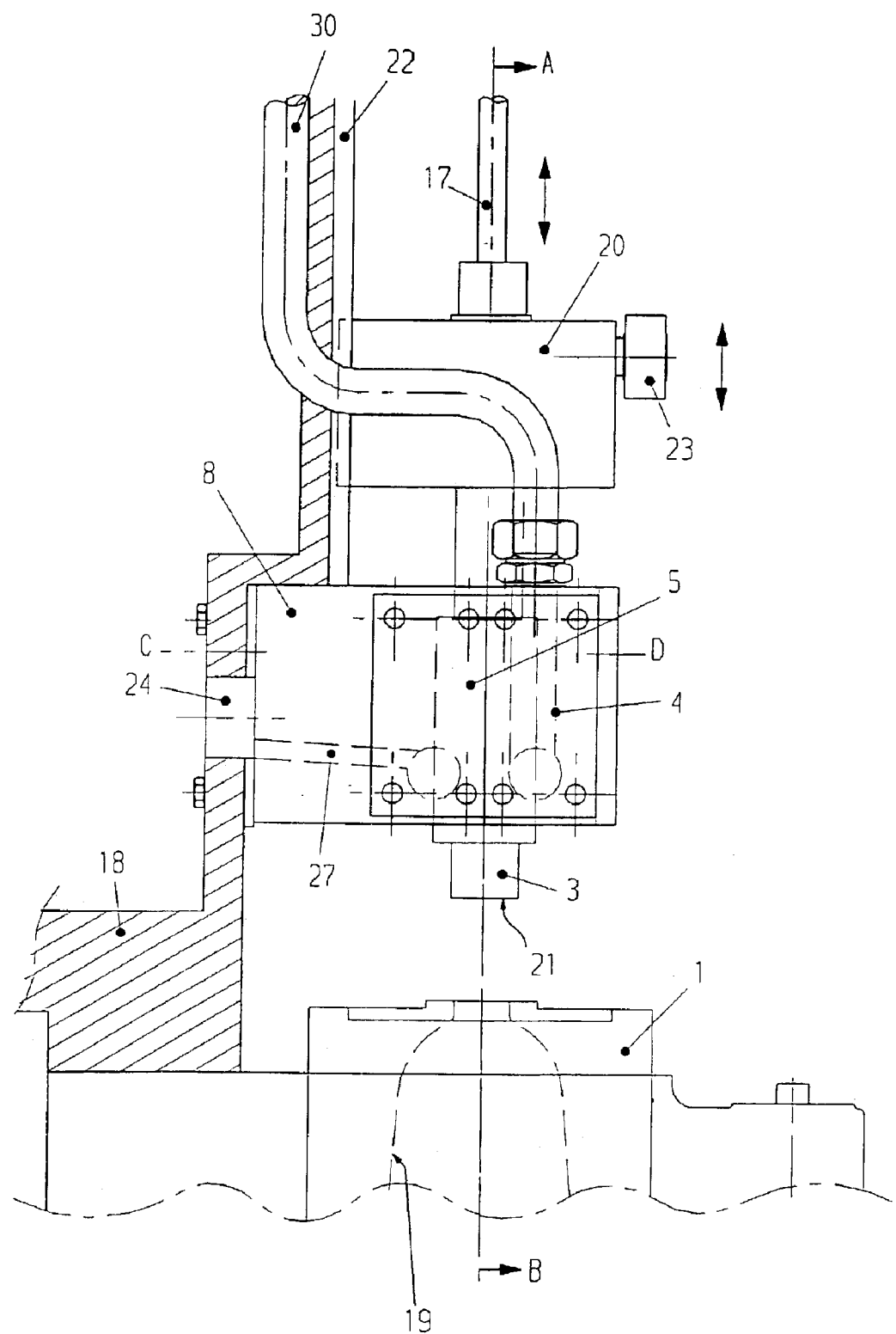

BLOW MOLDING MACHINE COMPRISING CONTROL VALVES, WHICH ARE MOUNTED ON THE BLOWING DEVICE AND WHICH CONTROL THE BLOWING AIR

REFERENCE TO RELATED APPLICATIONS

This application is the United States national stage (under 35 U.S.C. §371) of international application PCT/EP01/12011, filed Oct. 17, 2001, and claims priority to German patent application DE 200 18 500.4, filed Oct. 28, 2000.

FIELD OF THE INVENTION

The invention pertains to a blow molding machine such as for forming beverage containers.

BACKGROUND OF THE INVENTION

Various designs of blow molding machines of this type are known, with or without a mechanical stretching member, in which the usually tubular or bell-shaped blow nozzle can be applied in a gastight manner directly to the orifice of a preform or a transfer mandrel carrying a preform, for example. In the known blow molding machines, the control valves for low pressure blow air, high pressure blow air, venting, etc., are arranged in the blow molding machine at some distance from the blow nozzle, and if necessary are connected to the actual blow nozzle by means of flexible lines (for example U.S. Pat. No. 4,214,860). Because of the high pressure in blow molding machines, in the area of 40 bar, these long lines cause a delay during blowing or venting, and thus have a negative influence on the short cycle times during the blow process, which are desired for performance-related reasons.

SUMMARY OF THE INVENTION

The invention undertakes to remedy the aforementioned situation and to provide a blow molding machine which can work with very short cycle times.

On the one hand, the integration of the blow nozzle and the valves according to the invention facilitates extremely short flow distances and thus short control times. On the other hand, the annular arrangement of the valves provides sufficient room for large valves despite the compact design of the "control block" according to the invention.

A particularly compact design with optimal flow cross-sections is achieved when, according to the advantageous further developments of the invention, the circumference of the valve carrier is essentially rectangular, and a low pressure valve, a high pressure valve and two venting valves are arranged at the two opposing sides of the circumference of said valve carrier.

According to another advantageous further development of the invention, the valve carrier is stationary and the blow nozzle is arranged in the blow molding machine in a longitudinally movable fashion, whereby the feeding and removing of the blow air is carried out via corresponding holes in the valve carrier and/or in the blow nozzle. In this way, flexible connection lines can be forgone altogether, and the advantages of the invention can be fully utilized even in the case of a height-adjustable blow nozzle.

Other advantageous further developments of the invention are specified in the remaining subclaims.

DETAILED DESCRIPTION OF THE DRAWINGS

Below, an exemplified embodiment of the invention shall be described with the aid of drawings. The figures are showing:

FIG. 1 the lateral view of a blow station of a blow molding machine in the area of the blow nozzle.

Figure 2:
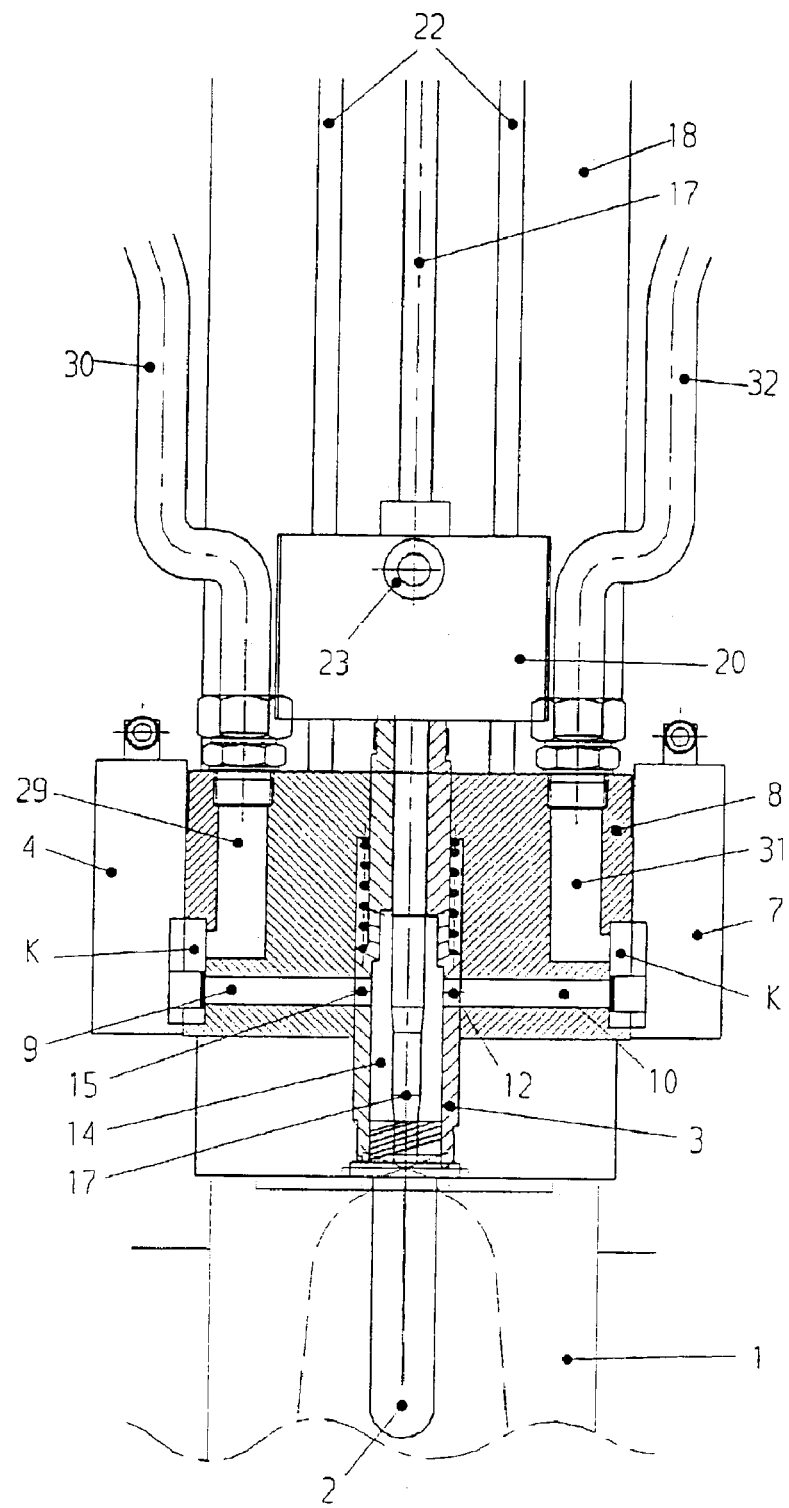

FIG. 2 section A B according to FIG. 1.

Figure 3:
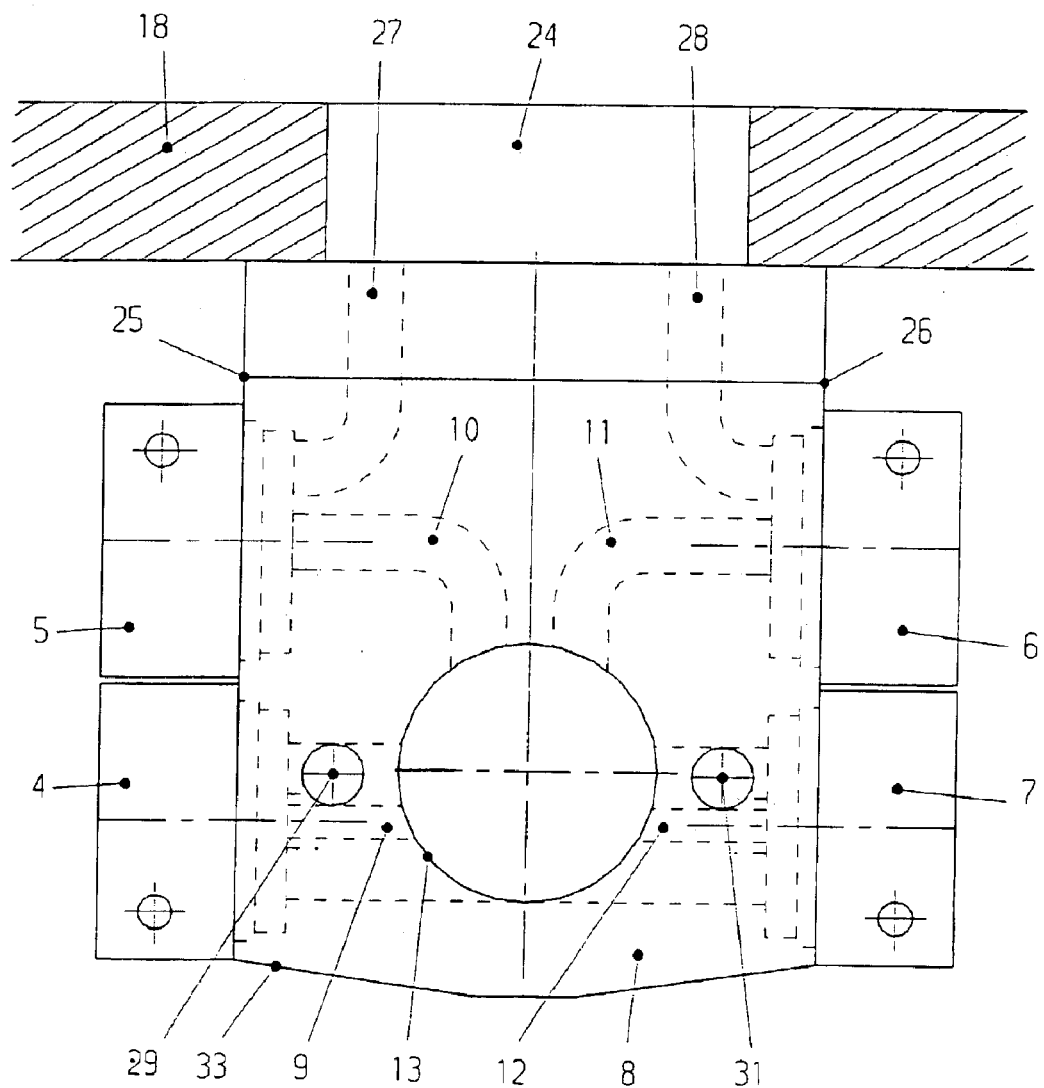

FIG. 3 section C D according to FIG. 1.

The blow station according to FIGS. 1 to 3 features a stationary or rotating base 18, on which a folding split blow mold 1 of typical design is arranged. The cavity 19 of the blow form 1 defines the contour of the bottles to be produced.

A tubular blow nozzle 3 with an opening 21 at the lower end is arranged above the blow mold 1, concentrically with its horizontal center axis. The blow nozzle 3 is fixed to a cradle 20, which is movable parallel to the center axis of the blow mold 1 in a straight guide 22 of the base 18. A cam roller 23 is rotatably arranged on the cradle 20. The vertical movement and the position of the blow nozzle 3 is defined by the cam roller 23 in connection with an operating cam, which is not shown here. FIG. 1 shows the upper end position of the blow nozzle 3, in which, with the blow mold 1 extended, a heated preform 2 made of PET is inserted into the blow mold 1, or a ready, formed bottle is removed from the blow mold 1. FIG. 2 shows the lower end position of the blow nozzle 3, in which it is pressed, in a gastight manner, to the orifice or the neck collar of a preform 2 seated in the closed blow mold 1. In this position, the low pressure or high pressure blow air is fed into the preform 2 by means of the blow nozzle 3, and the ready bottle is vented after the molding process is completed.

In the medium and upper height range, the height-adjustable blow nozzle 3 is fully surrounded by an annular valve carrier 8, rigidly fastened to the base 18. More specifically, the blow nozzle 3 with its cylindrical jacket is guided in a height-adjustable manner in a vertical central hole 13 of the valve carrier 8 and sealed.

The blow nozzle 3 features a longitudinal hole 14, which forms the opening 21 at the lower end. The longitudinal hole 14 is axially penetrated by a height-adjustable stretching mandrel 17, whereby the remaining annular space between the longitudinal hole 14 and the stretching mandrel 17 forms the actual flow path for the blow air. At the top, the stretching mandrel 17 exits the blow nozzle 3, or the surrounding valve carrier 8, in a gastight and movable manner, and connects to a control cylinder of common design, which is not shown here. By means of the latter, the stretching mandrel 17 is arranged in the blow station in a height-adjustable manner, independently from the blow nozzle 3.

As shown in FIG. 3, the valve carrier 8 features an essentially square circumference with vertical surfaces, two of which are parallel to each other. The intermediary horizontal surface is adjacent to the base 18 in the area of the venting hole 24.

Four similar, electrically or pneumatically actuated valves 4 through 7 with a simple two-way or open-close function are attached to the two parallel lateral surfaces 25, 26 of the valve carrier 8. The two valves adjacent to the base 18 are for venting, i.e. removing the blow air from the ready, formed bottle, and are usually switched jointly. The second valve 4 on the lateral surface 25 controls the low pressure blow air fed into the preform 2, while the second valve 7 on the other lateral surface 26 controls the high pressure blow air. The valves 6, 7 are usually switched one after the other. The valves 4 through 7 are arranged at the same height and distributed around the circumference of the valve carrier 8. However, it is also conceivable to arrange both valves on a lateral surface one above the other, whereby the distribution along the circumference of the valve carrier 8 is retained.

The valve chambers K of all four valves 4 through 7 are connected to the central hole 13 by means of holes 9 through 12, located directly in the valve carrier 8, in the shortest possible way. This is especially true for the low pressure valve 4 and the high pressure valve 7, which are located closer to the central hole 13 than the two venting valves 5 and 6.

In the upper area of its longitudinal hole 14, the blow nozzle 3 features a plurality of short horizontal cross holes, of which the cross holes 15 and 16 can be seen in FIG. 2. These cross holes connect the longitudinal hole 14 and thus the opening 21 of the blow nozzle 3 in its working position with the holes 9 through 12 in the shortest possible way.

By means of further channels 27, 28 arranged in the valve carrier 8, the valve chambers K of both valves 5 and 6 are connected with a venting hole 24 in the base 18, which opens up to the outside via a muffler, not shown here.

By means of a further channel 29, arranged in the valve carrier 8, the low pressure valve 4 is connected to the upper side of the valve carrier 8. There, the channel 29 is connected to a rigid compressed air line 30, which leads to a source of low pressure compressed air, not shown here. Correspondingly, the valve chamber K of the high pressure valve 7 is joined by channel 31, which is arranged inside the valve carrier 8 and connected to a rigid compressed air line 32. The latter leads to a source of high pressure compressed air, not shown here.

Instead of the stationary arrangement of the valve carrier 8 shown here, it is also possible to connect said valve carrier 8 rigidly with the height-adjustable blow nozzle 3, or even shape these two elements as one part. In this case, the compressed air lines 30 and 32 must be flexible. If necessary, further valves can be arranged on the surface of the valve carrier 8 directed away from the base 18. In each case, the result is an extremely compact, space-saving design of the blow nozzle and the accompanying valves on the one hand, and short and large flow paths on the other hand.

What is claimed is:

1. Blow molding machine, comprising at least one blow mold (1) for producing hollow bodies from heated preforms (2), at least one blow nozzle (3) for leading the blow air into the preforms (2), and a plurality of valves (4 through 7) for controlling the feeding and the removal of the blow air to and from the blow nozzle (3), an annular valve carrier (8) at least partially surrounds the blow nozzle (3), the valves (4 through 7) being arranged on the valve carrier (8) and distributed along its circumference, and the valves (4 through 7) being connected to the blow nozzle (3) by means of holes (9 through 12) in the valve carrier (8), the blow nozzle (3) having a longitudinal hole (14) which can be connected to the holes (9 through 12) in the valve carrier (8) by at least one cross hole (15, 16) and wherein the valve carrier (8) is penetrated by a height-adjustable stretching mandrel (17).

2. Blow molding machine according to claim 1, wherein the stretching mandrel (17) is movable in the longitudinal hole (14) of the blow nozzle (3).

3. Blow molding machine comprising at least one blow mold (1) for producing hollow bodies from heated performs (2), at least one blow nozzle (3) for leading the blow air into the preforms (2), and a plurality of valves (4 through 7) for controlling the feeding and the removal of the blow air to and from the blow nozzle (3), an annular valve carrier (8) at least partially surrounds the blow nozzle (3), the valves (4 through 7) being arranged on the valve carrier (8) and distributed alone its circumference, and the valves (4 through 7) being connected to the blow nozzle (3) by means of holes (9 through 12) in the valve carrier (8), and at least one low pressure valve (4), one high pressure valve (7) and one venting valve (5, 6) is arranged along the circumference of the valve carrier (8).

4. Blow molding machine according to claim 3, and at least two venting valves (5, 6) are arranged on the circumference of the valve carrier (8).

5. Blow molding machine according to claim 3, wherein the circumference of the valve carrier (8) is essentially square and that the valves (4 through 7) are arranged at two opposing sides of the circumference.

6. Blow molding machine according to claim 5, wherein the valves (4 through 7) and the holes (9 through 12) are in essence arranged symmetrically.

7. Blow molding machine according to claim 1, wherein the blow nozzle (3) is arranged in the valve carrier (8) in a longitudinally movable manner.

8. Blow molding machine according to claim 7, wherein the blow nozzle (3) is arranged in the central hole (13) in the valve carrier (8).

* * * * *

UNITED STATES PATENT AND TRADEMARK OFFICE
CERTIFICATE OF CORRECTION

PATENT NO. : 6,905,326 B2
DATED : June 14, 2005
INVENTOR(S) : Klaus Voth et al.

It is certified that error appears in the above-identified patent and that said Letters Patent is hereby corrected as shown below:

Title page,
Item [73], Assignee, should read -- Krones AG, Neutraubling (DE) --;
Item [30], Foreign Application Priority Data, "200 18 500 U" should be
-- 200 18 500.4 U --;
Item [57], ABSTRACT,
Lines 2 and 3, "performs" should be -- preforms --;

Column 4,
Line 15, "performs" should be -- preforms --; and
Line 23, "alone" should be -- along --.

Signed and Sealed this

Twenty-seventh Day of September, 2005

JON W. DUDAS
*Director of the United States Patent and Trademark Office*